United States Patent
Friedrich

(10) Patent No.: US 11,897,369 B2
(45) Date of Patent: Feb. 13, 2024

(54) SYSTEM AND METHOD FOR REDUCING KINETOSIS SYMPTOMS

(71) Applicant: Bayerische Motoren Werke Aktiengesellschaft, Munich (DE)

(72) Inventor: Thomas Friedrich, Woerthsee (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 576 days.

(21) Appl. No.: 16/955,544

(22) PCT Filed: Dec. 13, 2018

(86) PCT No.: PCT/DE2018/101014
§ 371 (c)(1),
(2) Date: Jun. 18, 2020

(87) PCT Pub. No.: WO2019/120381
PCT Pub. Date: Jun. 27, 2019

(65) Prior Publication Data
US 2020/0317089 A1    Oct. 8, 2020

(30) Foreign Application Priority Data
Dec. 21, 2017 (DE) .................... 10 2017 223 609.4

(51) Int. Cl.
*B60K 35/00* (2006.01)
*B60N 2/02* (2006.01)
*B60N 2/90* (2018.01)

(52) U.S. Cl.
CPC .......... *B60N 2/0244* (2013.01); *B60K 35/00* (2013.01); *B60N 2/976* (2018.02);
(Continued)

(58) Field of Classification Search
None
See application file for complete search history.

(56) References Cited

U.S. PATENT DOCUMENTS

| | | | | |
|---|---|---|---|---|
| 2006/0095180 A1* | 5/2006 | Ummethala | ........... | B60N 2/544 701/37 |
| 2006/0200287 A1* | 9/2006 | Parison | .................. | B60N 2/501 701/1 |

(Continued)

FOREIGN PATENT DOCUMENTS

| | | |
|---|---|---|
| CN | 101497321 A | 8/2009 |
| CN | 104554095 A | 4/2015 |

(Continued)

OTHER PUBLICATIONS

Chinese-language Office Action issued in Chinese Application No. 201880076449.2 dated Nov. 17, 2021 (17 pages).

(Continued)

*Primary Examiner* — James M McPherson
(74) *Attorney, Agent, or Firm* — Crowell & Moring LLP

(57) ABSTRACT

A system reduces motion sickness symptoms for occupants of a vehicle. The system has a control unit which is coupled to a sensor system and/or a navigation system, a vehicle seat system, and/or a display unit for receiving and/or outputting signals. The control unit is designed to generate seat adjustment signals and/or display signals depending on received surroundings data and/or vehicle component data.

11 Claims, 3 Drawing Sheets

(52) U.S. Cl.
CPC .. *B60K 2370/152* (2019.05); *B60K 2370/166* (2019.05); *B60K 2370/176* (2019.05); *B60K 2370/48* (2019.05); *B60N 2/0268* (2023.08)

(56) References Cited

U.S. PATENT DOCUMENTS

| | | | | |
|---|---|---|---|---|
| 2011/0109462 | A1* | 5/2011 | Deng | G08B 21/06 |
| | | | | 340/576 |
| 2013/0006478 | A1 | 1/2013 | Lin | |
| 2015/0120149 | A1 | 4/2015 | Worrel et al. | |
| 2016/0167672 | A1 | 6/2016 | Krueger | |
| 2016/0318395 | A1* | 11/2016 | Cofer | G08B 25/08 |
| 2017/0136842 | A1* | 5/2017 | Anderson | B60N 2/0244 |
| 2017/0253254 | A1* | 9/2017 | Sweeney | G05D 1/02 |
| 2017/0267253 | A1 | 9/2017 | Schmidt et al. | |
| 2017/0313326 | A1 | 11/2017 | Sweeney et al. | |
| 2018/0072189 | A1* | 3/2018 | Plante | B62D 17/00 |
| 2018/0178690 | A1* | 6/2018 | Castillo | B60N 2/0244 |
| 2018/0281623 | A1* | 10/2018 | Matsumoto | B60N 2/0232 |
| 2020/0120871 | A1* | 4/2020 | Woodrum | B60N 2/18 |
| 2022/0017109 | A1 | 1/2022 | Hwang et al. | |

FOREIGN PATENT DOCUMENTS

| | | |
|---|---|---|
| CN | 107215296 A | 9/2017 |
| DE | 197 30 366 A1 | 1/1999 |
| DE | 101 56 219 C1 | 8/2003 |
| DE | 10 2007 000 182 A1 | 10/2007 |
| DE | 10 2012 023 931 A1 | 6/2014 |
| DE | 10 2014 221 337 A1 | 4/2015 |
| DE | 10 2015 011 708 A1 | 5/2016 |
| DE | 10 2015 015 306 A1 | 5/2016 |
| DE | 10 2016 009 137 A1 | 2/2017 |
| ES | 2 226 584 A1 | 3/2005 |
| WO | WO 2016/188545 A1 | 12/2016 |
| WO | WO 2016/197068 A1 | 12/2016 |

OTHER PUBLICATIONS

International Search Report (PCT/ISA/210) issued in PCT Application No. PCT/DE2018/100823 dated Jan. 8, 2019 with English translation (five (5) pages).
German-language Written Opinion (PCT/ISA/237) issued in PCT Application No. PCT/DE2018/100823 dated Jan. 8, 2019 (seven (7) pages).
German-language Search Report issued in German Application No. 10 2017 223 610.8 dated Sep. 21, 2018 with partial English translation (15 pages).
International Search Report (PCT/ISA/210) issued in PCT Application No. PCT/DE2018/101014 dated Apr. 12, 2019 with English translation (six (6) pages).
German-language Written Opinion (PCT/ISA/237) issued in PCT Application No. PCT/DE2018/101014 dated Apr. 12, 2019 (six (6) pages).
German-language Search Report issued in German Application No. 10 2017 223 609.4 dated Apr. 13, 2018 with partial English translation (12 pages).
United States Non-Final Office Action issued in U.S. Appl. No. 16/955,530 dated Dec. 22, 2022 (23 pages).
Chinese-language Office Action issued in Chinese Application No. 201880071887.X dated Apr. 20, 2022 with English translation (21 pages).

* cited by examiner

SYSTEM AND METHOD FOR REDUCING KINETOSIS SYMPTOMS

BACKGROUND AND SUMMARY OF THE INVENTION

The invention relates to a system and method for reducing motion sickness symptoms.

Methods that are applied in order to avoid motion sickness during a drive are already known from the prior art.

DE 10 2015 011 708 A1 discloses a method in which manual inputs by an occupant (health parameters) are correlated with vehicle parameters and route parameters in order to determine a discomfort threshold in terms of motion sickness-induced illness. In order to counteract the occurrence of motion sickness-induced illness, the vehicle is then air-conditioned, fragranced and/or a seat massage function is activated.

The methods known from the prior art record the risk of motion sickness-induced illness in a passenger and recommend countermeasures in order to avoid the occurrence of motion sickness in the passenger, for example based on the parameters input by the passenger.

As a result of concentrated activities, for example on a monitor, that are additionally possible as a result of autonomous vehicle guidance, the occupant easily loses the spatial reference with respect to the vehicle surroundings. The accelerations, rotations and changes in incline nevertheless acting dynamically on said occupant and perceived physiologically thereby are therefore no longer congruent and in accordance with his actual optical perception. The occupant may therefore become unwell and nauseous, and if this continues the occupant may become dizzy and/or be sick (motion sickness).

Although countermeasures (ventilation, massage, etc.) are initiated in the methods known from the prior art, it is not clear in this case whether these also help each occupant with regard to motion sickness symptoms that suddenly occur.

One object of the invention is therefore to provide a system and a method for reducing motion sickness symptoms that at least partly overcomes the disadvantages of the methods known from the prior art.

The object is achieved by the features of the independent patent claims. Advantageous embodiments are described in the dependent claims. It is pointed out that additional features of a patent claim dependent on an independent patent claim, without the features of the independent patent claim or in combination only with a subset of the features of the independent patent claim, may form a separate invention independent of the combination of all of the features of the independent patent claim that may be made into the subject matter of an independent claim, of a divisional application or of a subsequent application. This applies analogously to the technical teaching described in the description, which teaching may form an invention independent of the features of the independent patent claims.

A first aspect of the invention relates to a system for reducing motion sickness symptoms for a vehicle, wherein the system has a control unit that is coupled to a sensor system and/or to a navigation system, to a vehicle seat system and/or to a display unit in order to receive and/or emit signals.

The control unit is preferably coupled to a sensor system and/or to a navigation system, to a vehicle seat system and to a display unit in order to receive and/or emit signals. If the display and the vehicle seat are controlled accordingly, the risk of motion sickness symptoms arising for the vehicle occupants is able to be reduced considerably.

The term "motion sickness" is understood to mean an illness caused by the influence of movements on the human body. Motion sickness is usually also referred to as travel sickness and usually called seasickness, airsickness or space sickness depending on where the movement takes place. Motion sickness is caused by movement and in particular by repeated acceleration procedures with changing acceleration values and acceleration directions. Motion sickness symptoms comprise nausea, vomiting, dizziness, paleness, a drop in blood pressure, palpitations, outbreaks of sweating and hyperventilation.

A vehicle within the meaning of the present document should be understood to mean any vehicle by way of which people and/or goods are able to be moved. Possible examples of a vehicle are: motor vehicle, truck, land vehicles, buses, driver's cabins, cable cars, elevator cars, rail vehicles, watercraft (for example ships, boats, submarines, diving bells, hovercraft, hydrofoils), aircraft (aeroplanes, helicopters, ground effect vehicles, airships, balloons). The vehicle is preferably a motor vehicle. A motor vehicle in this sense is a land vehicle that is moved by mechanical force without being linked to rails. A motor vehicle in this sense comprises a motor car, a motorcycle and a traction unit.

The control unit is a unit that receives information, for example in the form of signals and/or data, from a device, processes it and provides it to a further device or prompts the further device to perform a certain action. For this purpose, the control unit is coupled in terms of communication to one or more devices, such as for example to the sensor system, the navigation system, the vehicle seat system and/or the display unit, that is to say so as to receive and/or emit signals. The coupling (in terms of communication) may be wireless (for example Bluetooth, WLAN, mobile radio) or wired (for example by way of a USB interface, data cable, etc.). Even if the control unit is described as a unit, then this should also be understood to mean a control unit that has a plurality of parts. For example, the term "control unit" also includes the situation in which individual control functions are distributed to other devices mentioned in this document. This could be the case for example when the function of generating the seat adjustment signals is performed in the vehicle seat system itself. In other words, parts of the control unit may be distributed to devices, such as for example the sensor system, the navigation system, the vehicle seat system and/or the display unit.

The control unit and/or the sensor system and/or the navigation system or one or more components thereof may be a device in the vehicle. In addition or as an alternative thereto, it may be an external device, for example a stationary device and/or a mobile terminal.

The sensor system and the navigation system are configured so as to receive surroundings data of the vehicle and transmit them to the control unit. Surroundings data of the vehicle mean data that relate to the surroundings of the vehicle. Such surroundings data comprise weather data, topology data (in particular topology data about the route to be traveled, such as for example the occurrence of curves, hills and/or traffic lights, the flatness of the roadway or lack of flatness of the roadway), route data, surroundings data (in particular surroundings data determined by the sensor system with the additional assistance of a surroundings model), data about the start and/or destination of a selected route, etc. Surroundings data in particular mean data that have an effect on the vehicle from outside the vehicle. The surroundings data are preferably obtained using highly accurate maps.

The sensor system and the navigation system are furthermore configured so as to receive vehicle component data of the vehicle, from which movements of the vehicle result, and to transmit them to the control unit. Such vehicle component data comprise data about engine components, chassis components (brake system, suspension, damping system, steering system, wheel suspension, wheels, tires, etc.), bodywork components, force transmission components (for example transmission, shaft, clutch, etc.). The movements of the vehicle, which result from the movement of the vehicle components, comprise translational and rotational movements in the direction of the vehicle longitudinal axis, vehicle transverse axis and vehicle height axis.

The sensor system comprises at least one of the following apparatuses: ultrasound sensor, radar sensor (for example short-range radar sensor, long-range radar sensor), lidar sensor, position inertial system (for example piezo system, longitudinal and rotational acceleration system), video system and/or image sensor (for example camera). The data of the sensor system may stem from one of the abovementioned apparatuses or from a combination of a plurality of the abovementioned apparatuses (sensor data fusion).

A navigation system within the meaning of the present document should be understood to mean a system that makes it possible to create a route and enables guidance to a selected destination through position determination (for example GPS, GLONASS, Galileo, Beidou, etc.) and/or geographical information (topology maps, road maps, air maps or sea maps).

The surroundings data may be received by the sensor system and/or the navigation system and transmitted to the control unit. The vehicle component data may likewise be received by the sensor system and/or the navigation system and transmitted to the control unit.

The vehicle seat system is configured so as to receive seat adjustment signals from the control unit and to adjust at least one vehicle seat of the vehicle in accordance with the received seat adjustment signals.

A vehicle seat system within the meaning of the present document comprises at least one vehicle seat that is suitable for accommodating a seated vehicle occupant.

The term vehicle occupant in the present document should be understood to mean any person in the vehicle. The term vehicle occupant should be understood to mean both the driver and a driver who is not driving himself, as well as any passenger.

The vehicle seat system furthermore comprises an adjustment apparatus by way of which the at least one vehicle seat is able to be adjusted. In order to adjust the at least one vehicle seat, the vehicle seat system, in particular the adjustment apparatus of the vehicle seat system, receives seat adjustment signals from the control unit. The at least one vehicle seat is able to be rotated about its transverse, height and longitudinal axis and/or moved along its transverse, height and longitudinal axis by way of the adjustment apparatus of the vehicle seat system. The vehicle seat system may comprise seat rails for moving a vehicle seat, an adjustment device for adjusting the seat incline and/or seat height and/or a lordosis support.

The display unit is configured so as to receive display signals from the control unit and to display them. The display unit may have one or more display devices. The display signals are displayed acoustically, optically or haptically.

According to a further embodiment, the display signals comprise perception elements that are obtained at least in part from the surroundings data, wherein the perception elements reflect the surroundings, external to the vehicle, around the vehicle from the view of a vehicle occupant. The perception elements may be recordings, in particular real-time recordings, of a camera or a plurality of cameras and/or be artificially generated images. The camera recordings, in particular real-time camera recordings, may be generated for example by a camera fastened in the interior of the vehicle and that looks out of the vehicle in the direction of travel. As an alternative or in addition thereto, surroundings data that are generated for example by a surroundings sensor system may be processed into image data (artificially generated images) that are able to be displayed on the display unit.

The display signals preferably comprise image and/or video recordings of the surrounding traffic. In other words, the surroundings around the vehicle are displayed. That is to say for example the profile of the road, the topology (town, countryside, mountains), the vegetation (desert, forest, beach), the weather (sun, rain, snow), the time of day (daytime, nighttime), etc.

The display unit may have one or more existing display devices and/or one or more separate display devices. Exemplary implementations of such display devices may be a display means of the dashboard, a display (for example in the cockpit area and/or on the rear part of a vehicle seat and/or on the interior lining of the vehicle), a head-up display (for example in one or more of the windows of the vehicle), an infotainment system, an on-board computer, a communication unit, a combined instrument, a mobile terminal, etc.

The term "combined instrument" in the present document is understood to mean an operating unit that comprises displays and/or functions that relate inter alia to the following: tachometer, mileage counter, revolution counter, fuel level display, coolant temperature display, monitoring lights and direction indicators.

The term "infotainment system" in the present document is understood to mean an operating unit that comprises a plurality of functions that relate to information and/or entertainment. Such functions relate to the following devices: car radio, navigation system, hands-free talking apparatus, on-board computer, driving data display, air-conditioning system, driver assistance systems.

The infotainment system and the combined instrument have various interfaces to one or more of the following: one or more controllers, external devices, preferably electronic terminals, storage media, data sources, computer unit.

One or more display devices may be arranged on interior fitting elements of the vehicle. Interior fitting elements should be understood to mean all of the components within a vehicle that are visible to vehicle occupants. Examples of interior fitting elements are: front seat or back of the front seat, rear seat or back of the rear seat, door lining, side lining, instrument panel, vehicle roof, sun visor, carpet, central console, parcel shelf, sun blind, steering wheel, interior mirror, etc.

A mobile terminal is a device that is able to communicate wirelessly in a mobile network via local area networks (LANs), such as for example Wireless Fidelity (Wi-Fi), or via wide area networks (WANs), such as for example Global System for Mobile Communication (GSM), General Package Radio Service (GPRS), Enhanced Data Rates for Global Evolution (EDGE), Universal Mobile Telecommunications System (UMTS), High Speed Downlink/Uplink Packet Access (HSDPA, HSUPA), Long-Term Evolution (LTE), or World Wide Interoperability for Microwave Access (WIMAX). Communication using other current or future communication technologies is possible. The term mobile terminal in particular includes smartphones, but also other mobile telephones, personal digital assistants (PDAs), tablet PCs and all current and future electronic devices that are equipped with technology for loading and executing apps. The mobile terminal may be coupled to the vehicle via an appropriate communication interface, for example a Bluetooth interface. As an alternative thereto, an app on the mobile terminal may be linked to the vehicle by way of a suitable authentication method via a server. All current and future authentication methods such as knowledge (for example username and password, PIN, security question, etc.), possession (for example SIM card, certificate, smartcard), biometrics (for example fingerprint, facial recognition) and any combination of the individual authentication methods come into consideration as authentication.

The control unit is configured so as to generate seat adjustment signals and/or display signals depending on the received surroundings data and/or vehicle component data.

The control unit is preferably configured so as to generate seat adjustment signals and display signals depending on the received surroundings data and/or vehicle component data. By generating and applying the seat adjustment signals and the display signals, the vehicle occupants are able to regain the spatial reference with respect to the vehicle surroundings, while at the same time the acceleration forces acting thereon are as far as possible minimized. The occurrence of motion sickness symptoms is thereby able to be reduced significantly or even avoided.

Generating the seat adjustment signals comprises the following actions: determining first acceleration forces acting on a vehicle occupant sitting on a vehicle seat due to the movements of the vehicle using the surroundings data and/or vehicle component data; and determining seat adjustment signals that are designed such that they bring about second acceleration forces that counteract the first acceleration forces for the vehicle occupant after adjusting the vehicle seat in accordance with these seat adjustment signals.

The seat adjustment signals are preferably determined automatically and dynamically. The at least one vehicle seat is likewise preferably adjusted automatically and dynamically in accordance with the seat adjustment signals. This means that, as soon as the first acceleration forces are determined, the seat adjustment signals are generated continuously and/or the vehicle seat or vehicle seats are adjusted continuously substantially without a time delay (phase shift) and/or scaling taking place. That is to say, the seat adjustment signals are generated in real time and/or the vehicle seat or vehicle seats are adjusted in real time. In other words, the seat adjustment signals are generated and/or the vehicle seat or vehicle seats are adjusted even before the vehicle occupant or the vehicle occupants each perceive the first acceleration forces. By virtue of adjusting the vehicle seat or vehicle seats in accordance with the seat adjustment signals, the vehicle occupant or vehicle occupants do not perceive the first acceleration forces, but rather the actually acting acceleration forces. The actually acting acceleration forces are the acceleration forces that remain when the second acceleration forces counteract the first acceleration forces. In the best case scenario, the first acceleration forces cancel out the second acceleration forces and the actually acting acceleration forces are zero.

In order to generate the respective seat adjustment signals (that is to say seat adjustment signals for just one vehicle seat or a plurality of vehicle seats), the movements of the vehicle, caused by the surroundings of the vehicle (for example bumpy ground) and/or by the movement of vehicle components (for example shaking of the passenger compartment), are thus first of all determined. The acceleration forces (first acceleration forces) acting on the vehicle occupant sitting on the respective vehicle seat are then determined through the determined movements of the vehicle. Second acceleration forces that counteract the first acceleration forces are then determined. Seat adjustment signals by way of which the second acceleration forces act on a vehicle occupant sitting on the respective vehicle seat are determined accordingly.

By way of example, during positive longitudinal acceleration of the vehicle and in the case of a vehicle occupant sitting in the direction of travel, a vehicle seat may be inclined forward to the extent that said vehicle occupant no longer perceives any (unpleasant) longitudinal acceleration. According to a further example, when entering a constant right-hand curve, the vehicle seat may be rotated to the left about the height axis such that the vehicle occupant is taken into the current turn rate only very slowly and subliminally. When traveling through the right-hand curve, the vehicle seat may be tilted to the right (in the direction of travel) to the extent that the vehicle occupant no longer perceives any (unpleasant) transverse acceleration. In a further example, in the case of a vertically oriented vertical impact caused by driving over a speed bump, the vehicle seat may be congruently moved downward such that the exposure to the impact is negligible to the vehicle occupant.

Generating the display signals comprises the following actions: determining the acceleration forces actually acting on the vehicle occupant on the vehicle seat adjusted in accordance with the seat adjustment signals; and determining display signals that are designed such that they bring about a sensory perception, congruent with the actually acting acceleration forces, for the vehicle occupant on the vehicle seat adjusted in accordance with the seat adjustment signals.

A sensory perception within the meaning of the present document comprises at least one of the following: visual perception, auditive perception, sensitivity (in particular tactile perception), olfactory perception and gustatory perception.

If the vehicle occupant were thus for example to experience actually acting acceleration forces that correspond to the acceleration of the vehicle, then the display signals are designed such that the vehicle occupant sensually perceives an acceleration of the vehicle. If the vehicle occupant were for example to experience actually acting acceleration forces that are equal to zero, then the display signals are designed such that the vehicle occupant does not sensually perceive any change in the driving of the vehicle.

Using the system or method described in the present document for reducing motion sickness symptoms, congruence between sensory stimulus and positional sensation is able to be created for each vehicle occupant. The dynamic positional sensation is alleviated or compensated by dynamically adjusting the vehicle seat or the vehicle seats. As a result, contradictory signals from the eyes, balance organs and articular receptors are avoided, and typical symptoms of travel sickness (motion sickness) are able to be reduced or even eliminated.

The display signals are advantageously displayed only for a certain duration if the seat adjustment signals change significantly in comparison with the currently adjusted vehicle seat or the currently adjusted vehicle seats. This is the case for example when the vehicle drives through a curve or over bumpy ground. If the vehicle however travels straight ahead over a substantially flat route, the generated seat adjustment signals would not be significantly different from the seat adjustment signals that led to the currently adjusted vehicle seat or the currently adjusted vehicle seats. In other words, the display signals are not displayed in quiet driving situations in which few or even no acceleration forces occur for the vehicle occupants.

The vehicle occupants are therefore not disrupted due to display signals that are displayed unnecessarily, and are able to concentrate on the tasks that they are performing, such as for example working on a computer.

The sensor system and the navigation system are advantageously furthermore configured so as to receive surroundings data and/or vehicle component data of the vehicle, from which movements of the vehicle result, and/or to transmit them to the control unit, only when the vehicle is at least in a partly automated driving mode, preferably at least in a highly automated driving mode and even more preferably in a fully automated driving mode.

As an alternative or in addition thereto, the control unit is advantageously furthermore configured so as to generate seat adjustment signals and/or display signals only when the vehicle is at least in a partly automated driving mode, preferably at least in a highly automated driving mode and even more preferably in a fully automated driving mode.

The automated driving modes mentioned in this document (partly automated driving mode, highly automated driving mode and fully automated or autonomous driving mode) correspond to the degrees of automation defined by the German Federal Highway Research Institute (BASt) (see BASt publication "Forschung kompakt" [Compact research], issued November 2012). In the case of partly automated driving (TAF), the system takes over the longitudinal and transverse guidance for a certain duration and/or in specific situations, wherein the driver has to continuously monitor the system. In the case of highly automated driving (HAF), the system takes over the longitudinal and transverse guidance for a certain duration without the driver having to continuously monitor the system; the driver must however be capable within a certain time of taking over vehicle guidance. In the case of fully automated (autonomous) driving (VAF), the system is able to automatically manage driving in all situations for a specific application case; a driver is then no longer required for this application case. The degrees of automation mentioned above in accordance with the definition of the BASt correspond to SAE Levels 2 to 4 of the SAE J3016 standard (SAE—Society of Automotive Engineering). By way of example, highly automated driving (HAF) according to the BASt corresponds to Level 3 of the SAE J3016 standard. SAE J3016 furthermore also provides SAE Level 5 as the highest degree of automation, this not being contained in the definition of the BASt. SAE Level 5 corresponds to driverless driving, in which the system is able to automatically manage all situations in the same way as a human driver throughout the entire journey; a driver is generally no longer required. The "fully automated" degree of automation is intended to jointly incorporate the case of driverless driving in the present document.

According to one embodiment, the control unit is furthermore configured so as to generate the seat adjustment signals only for a vehicle seat whose orientation deviates from the direction of travel of the vehicle; in addition or as an alternative thereto, the vehicle seat system is furthermore configured so as to receive seat adjustment signals from the control unit only for a vehicle seat whose orientation deviates from the direction of travel of the vehicle; in addition or as an alternative thereto, the vehicle seat system is furthermore configured so as to adjust only a vehicle seat whose orientation deviates from the direction of travel of the vehicle in accordance with the received seat adjustment signals.

As a result, only vehicle seats that are not oriented in the direction of travel are adjusted. The vehicle seat of a vehicle occupant sitting on the vehicle seat that is in the direction of travel in any case is accordingly not adjusted.

According to one embodiment, the display signals comprise at least one of the following: artificial optical surroundings, wherein the artificial optical surroundings are preferably displayed in an edge region of a display device; artificial optical surroundings, wherein the artificial optical surroundings are displayed outside the central sharply focused viewing axis of the respective vehicle occupant and within the individual field of view of the respective vehicle occupant; artificial acoustic surroundings; holographic image elements; air flows; and haptic effects on a vehicle occupant, in particular massage effects and/or vibration effects.

Holographic image elements are visual image elements that are created by way of holographic methods. By virtue of using holographic image elements, the display of the display signals may be designed to be variable in the interior of the vehicle and is not restricted to existing display devices such as displays, interior lining, windows, etc.

The term "artificial optical surroundings" means surroundings that are not real, that is to say artificially created visually perceptible surroundings.

As an alternative or in addition, the artificial optical surroundings may be displayed as an additive depiction in a display of an existing display device, for example as being blended into a navigation display.

The artificial optical surroundings are advantageously controlled depending on the current viewing direction of a vehicle occupant. This means that the artificial optical surroundings are displayed depending on the current viewing direction of a vehicle occupant outside the central sharply focused viewing axis of the vehicle occupant and within the individual field of view of the vehicle occupant. In other words, the artificial optical surroundings are displayed at the "eye angle" of the respective vehicle occupant.

The viewing direction of a vehicle occupant may be recorded using a viewing direction recording unit, such as for example a vehicle interior camera.

By recording the viewing direction of the respective vehicle occupant, the optical perception of the respective vehicle occupant is able to be congruently adapted in a particularly ergonomic manner to the positional and acceleration sensation of the respective vehicle occupant, without the vehicle occupant being distracted from his actual main task.

The artificial optical surroundings may be generated by a lighting system that comprises at least one lighting element. Exemplary lighting elements are: an LED light system, a laser light system, a vehicle interior light system (for example ambient lighting), etc. The lighting system preferably comprises at least one lighting element and a projection surface onto which the artificial optical surroundings are projected. The artificial optical surroundings may be depicted specifically in image form or in abstract form.

The artificial acoustic surroundings may be generated by a sonication system that comprises at least one sonication element. Exemplary sonication elements are: an entertainment system, a communication system, an infotainment system, speaker, etc.

By generating and applying the seat adjustment signals and display signals, the loading in terms of driving dynamics acting on the vehicle occupant is reduced and the discrepancy in the correlation between positional sensation and optical position perception is reduced or even compensated.

By way of example, during longitudinal acceleration of the vehicle and in the case of a vehicle occupant sitting in the direction of travel, the vehicle seat may be inclined forward to the extent that said vehicle occupant perceives a reduced or no longitudinal acceleration, and at the same time the artificial optical surroundings are moved to the extent that they correspond precisely to the change in the viewing direction caused by the change in the vehicle seat incline or that they at least partly optically compensate the acceleration component not completely compensated by the change in the seat incline. In a further example, the vehicle seat may be rotated to the left about the height axis upon entering a constant right-hand curve such that the vehicle occupant is taken into the current rotation rate only very slowly and subliminally, and at the same time the artificial optical surroundings are moved to the extent that they correspond precisely to the change in the viewing direction caused by the change in the vehicle seat orientation or that they at least partly optically compensate the acceleration component not completely compensated by the change in the vehicle seat orientation. When traveling through the right-hand curve, the vehicle seat may be tilted to the right (in the direction of travel) to the extent that the vehicle occupant no longer perceives any (unpleasant) transverse acceleration. In a further example, in the case of a vertically oriented vertical impact caused by driving over a speed bump, the vehicle seat may be congruently moved downward such that the exposure to the impact is negligible for the vehicle occupant, and at the same time the artificial optical surroundings are moved to the extent that they correspond precisely to the change in the viewing height caused by the dynamic change in the vertical seat position or that they at least partly optically compensate the acceleration component not completely compensated by the change in the seat position.

According to a further embodiment, the second acceleration forces are large enough that the first acceleration forces and the second acceleration forces cancel one another out. In other words, a vehicle occupant sitting on the respective vehicle seat does not perceive any acceleration.

According to a further embodiment, the display signals are varied depending on the surroundings of the vehicle and/or the time of day and/or the weather. Examples of the respective surroundings are: city, countryside, forest, desert, body of water, mountains, tunnel, etc. The brightness of optical display signals is for example reduced when driving through a tunnel and increased again when leaving the tunnel. Examples of the respective time of day are: daytime, twilight, nighttime. Examples of the respective weather are: sun, snow, rain, mist.

According to one embodiment, the display unit is designed such that the displayed display signals are not visible at the same time to all vehicle occupants.

The display unit may have a plurality of display devices, wherein each vehicle occupant is assigned a display device for displaying the display signals. By way of example, each vehicle occupant is assigned a display.

According to one embodiment, the display unit is designed such that the displayed display signals are visible only to one vehicle occupant or a particular subset of the vehicle occupants.

The display signals are preferably displayed so as to be visible only to the vehicle occupant or vehicle occupants who are on vehicle seats not oriented in the direction of travel.

The display signals are then displayed only on the display devices assigned to those vehicle occupants who are on their respective vehicle seat not oriented in the direction of travel.

As an alternative or in addition, one or more display devices may be equipped with view protection apparatuses (for example view protection films, view protection filters, particular display methods, etc.) in order to make the displayed display signals visible only to one vehicle occupant or a particular subset of the vehicle occupants, and not at the same time to all vehicle occupants.

By way of example, displays are arranged in each case in the backs of the front vehicle seats and/or side linings for the vehicle occupants in the back seat.

According to one embodiment, the system for reducing motion sickness symptoms furthermore has a warning unit that is coupled to the control unit in order to receive and/or emit signals. The control unit is furthermore configured so as to use the received surroundings data and/or vehicle component data to determine whether the vehicle will have an unavoidable crash within a predefined duration and, in the event that the vehicle will have an unavoidable crash within the predefined duration, to generate warning signals that are designed such that they bring about reflex protective reactions in vehicle occupants.

The predefined duration is 0-30 seconds, preferably 1-20 seconds, particularly preferably 2-10 seconds.

The term crash means an event in which the vehicle is put in a situation that deviates greatly from the previous situation and is thus not expected by the vehicle occupant or the vehicle occupants. This may be the case for example when the vehicle suddenly brakes abruptly, whether this be through a braking maneuver or a collision with an object. The term crash preferably comprises a collision of the vehicle with an object.

Due to the fact that the vehicle occupants do not experience any acceleration forces or experience only reduced acceleration forces or are concentrating on a perceived task, the in particular reflex protective measures normally brought about by a crash are not automatically triggered in the vehicle occupants. In order nevertheless to optimally prepare the vehicle occupants for the consequences of a crash, the warning unit therefore emits warning signals.

The warning unit may comprise devices internal to the vehicle that are suitable for warning vehicle occupants. Such devices internal to the vehicle are for example: speaker, seat massage unit, ventilation system, infotainment system, steering wheel, etc.

The warning signals comprise visual signals and/or acoustic signals and/or haptic signals and/or olfactory signals. In other words, the warning signals are designed such that they address the visual perception and/or auditive perception and/or haptic perception and/or olfactory perception of the vehicle occupant or vehicle occupants. The warning signals are designed such that they incite the vehicle occupant or vehicle occupants in a reflex manner to perform physical protective reactions, for example adopting a physical protective position.

The warning unit preferably comprises speakers internal to the vehicle that emit acoustic warning signals. In addition or as an alternative, the warning unit preferably comprises a steering wheel with a vibration function that emits warning signals through vibrations.

The warning unit outputs warning signals only when a crash is unavoidable within a predefined duration. This means that the calculation works out that there is no possible action (for example avoidance maneuver) that could avoid a crash. The warning signals from the warning unit therefore do not correspond to the signals that a pedestrian protection or collision protection system outputs for example in order to incite the driver of a vehicle to perform a particular action (for example braking). The warning signals within the meaning of the present document should be understood to mean the possibility of preparing a vehicle occupant for the crash that will take place in order to minimize the physical consequences of the crash (injuries).

According to one embodiment, the system for reducing motion sickness symptoms furthermore comprises a monitoring unit that is coupled to the control unit in order to receive and/or emit signals. The monitoring unit is configured so as to monitor whether a vehicle occupant is capable of perceiving a situation external to the vehicle, and to emit a positive monitoring signal to the control unit if the respective vehicle occupant is capable, and to emit a negative monitoring signal to the control unit if the respective vehicle occupant is incapable. The control unit is furthermore configured so as to generate seat adjustment signals for the vehicle seat on which the respective vehicle occupant is sitting and/or to generate display signals for the respective vehicle occupant only if a negative monitoring signal is present. The display unit is furthermore configured such that the displayed display signals are visible in each case just to one vehicle occupant.

According to a further embodiment, the system for reducing motion sickness symptoms furthermore has a monitoring unit that is coupled to the control unit in order to receive and/or emit signals and is configured so as to monitor whether a vehicle occupant is capable of perceiving a situation external to the vehicle, and to emit a positive monitoring signal to the control unit if the respective vehicle occupant is capable, and to emit a negative monitoring signal to the control unit if the respective vehicle occupant is incapable. The vehicle seat system is furthermore configured so as to receive seat adjustment signals for the vehicle seat on which the respective vehicle occupant is sitting and/or to adjust the vehicle seat on which the respective vehicle occupant is sitting only if a negative monitoring signal is present. The display unit is furthermore configured so as to receive and/or to display display signals for the respective vehicle occupant only if a negative monitoring signal is present.

In order to monitor whether a vehicle occupant is capable of perceiving a situation external to the vehicle, the monitoring unit may comprise one or more sensors, in particular a camera (for example interior camera), that evaluates biometric features of the vehicle occupant. Biometric features comprise in particular: facial geometry, iris recognition, lip movement, voice recognition, keystroke behavior (for example on a smartphone, keyboard, etc.), fingerprint. Situation external to the vehicle means situations that take place outside the vehicle. A situation may mean an event, but also the surroundings (for example row of trees) outside a vehicle.

If the monitoring unit for example records that a vehicle occupant has lowered his head and directed his eyes toward a smartphone display, then it is assumed that the respective vehicle occupant is not capable of perceiving a situation external to the vehicle. A negative monitoring signal is therefore then emitted to the control unit.

According to a further embodiment, the surroundings data and vehicle component data comprise only data from which movements of the vehicle result that substantially do not run along the vehicle height axis. In other words, the surroundings data and vehicle component data comprise data from which movements of the vehicle result substantially along the vehicle longitudinal axis and substantially along the vehicle transverse axis, rolling movements (rotational movements about the vehicle longitudinal axis), pitching movements (rotational movements about the vehicle transverse axis) and yaw movements (rotational movements about the vehicle height axis).

If such surroundings data and vehicle component data that relate to all of the movements of the vehicle other than the movements of the vehicle that run substantially along the vehicle height axis are used to generate the seat adjustment signals, movements of the vehicle along the vehicle height axis are not counteracted by the vehicle seat system and the vehicle occupants experience the acceleration forces arising due to the movement substantially along the vehicle height axis. If a vehicle thus travels over bumpy ground, the vehicle seat system would not adjust the respective vehicle seat with respect to how the acceleration forces would act substantially along the vehicle height axis.

According to one embodiment, a vehicle is equipped with an embodiment of the above-described system for reducing motion sickness symptoms.

A second aspect of the invention relates to a method for reducing motion sickness symptoms, wherein the method comprises: receiving surroundings data and/or vehicle component data of a vehicle from which movements of the vehicle result. Generating seat adjustment signals and/or display signals depending on the received surroundings data and/or vehicle component data. Adjusting at least one vehicle seat of the vehicle in accordance with the seat adjustment signals and/or displaying the display signals.

Generating the seat adjustment signals comprises the following actions: determining first acceleration forces acting on a vehicle occupant sitting on a vehicle seat due to the movements of the vehicle using the surroundings data and/or vehicle component data; and determining seat adjustment signals that are designed such that they bring about second acceleration forces that counteract the first acceleration forces for the vehicle occupant after adjusting the vehicle seat in accordance with these seat adjustment signals.

Generating the display signals comprises the following actions: determining the acceleration forces actually acting on the vehicle occupant on the vehicle seat adjusted in accordance with the seat adjustment signals; and determining display signals that are designed such that they bring about a sensory perception, congruent with the actually acting acceleration forces, for the vehicle occupant on the vehicle seat adjusted in accordance with the seat adjustment signals.

The above explanations regarding the system according to the invention for reducing motion sickness symptoms according to the first aspect of the invention also apply analogously to the method according to the invention for reducing motion sickness symptoms according to the second aspect of the invention; advantageous exemplary embodiments of the method according to the invention correspond to the described advantageous exemplary embodiments of the system according to the invention. Advantageous exemplary embodiments of the method according to the invention that are not described explicitly at this point correspond to the described advantageous exemplary embodiments of the system according to the invention.

According to one embodiment, the method for reducing motion sickness symptoms furthermore comprises the following action: determining, using the received surroundings data and/or vehicle component data, whether the vehicle will have an unavoidable crash within a predefined duration and, in the event that the vehicle will have an unavoidable crash within the predefined duration, generating warning signals that are designed to warn the vehicle occupant about the crash.

According to a further embodiment, the method furthermore comprises the following action: monitoring whether a vehicle occupant is capable of perceiving a situation external to the vehicle, and generating seat adjustment signals and/or display signals only if it is established that the vehicle occupant is incapable. The displayed display signals are in this case visible in each case only to one vehicle occupant.

According to a further embodiment, the method furthermore comprises the following action: monitoring whether a vehicle occupant is capable of perceiving a situation external to the vehicle, and receiving seat adjustment signals and/or adjusting the vehicle seat and receiving display signals and/or displaying the display signals only if it is established that the vehicle occupant is incapable. The displayed display signals are in this case visible in each case only to one vehicle occupant.

The invention is described below with reference to exemplary embodiments, with the additional assistance of the attached drawings.

DETAILED DESCRIPTION OF THE DRAWINGS

Figure 1:
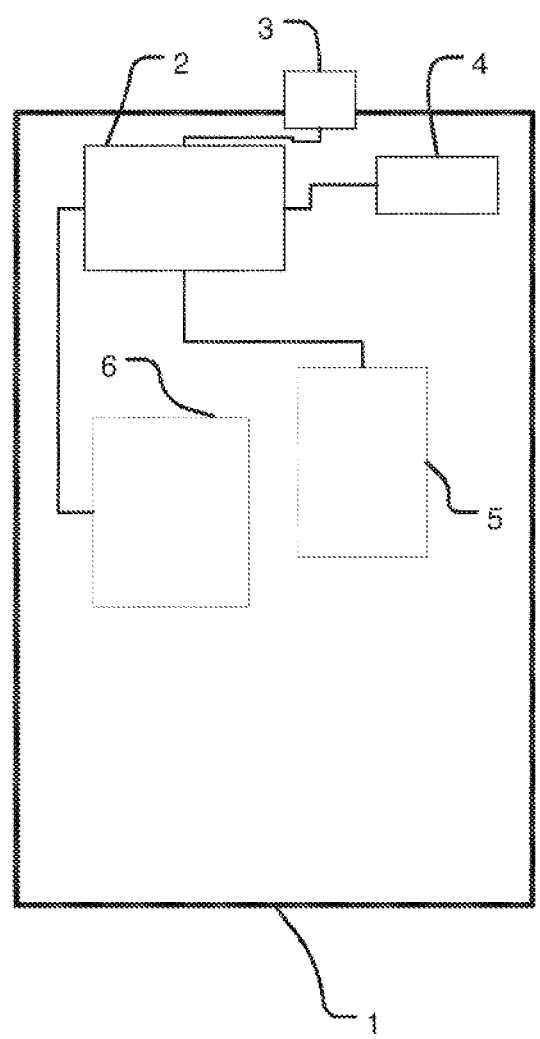
FIG. 1 schematically shows a system for reducing motion sickness symptoms according to one embodiment.

FIG. 1 shows a system for reducing motion sickness symptoms. The system is provided for a vehicle 1. Even though the system is illustrated together with a vehicle 1 in FIG. 1, this is not intended to mean that the system is always connected to a vehicle 1, but rather to explain merely by way of example that the system may be provided for a vehicle 1.

The system has a control unit 2 that is coupled to a surroundings sensor system 3, to a navigation system 4, to a vehicle seat system 5 and to a display unit 6 in order to receive and/or emit signals.

Surroundings data, that is to say data that describe the surroundings of the vehicle 1 and/or the surroundings of the route ahead of the vehicle 1, are compiled by way of the surroundings sensor system 3 and/or the navigation system 4 and forwarded to the control unit 2. In this example, the surroundings data describe inter alia the topology of the route ahead, this being obtained for example from a highly accurate map. The surroundings data relevant to the vehicle 1 are determined on the basis of the route planned by the navigation system 4.

The control unit 2 generates seat adjustment signals and display signals depending on the surroundings data. To generate the seat adjustment signals, the recorded surroundings data are used to calculate the movements of the vehicle. According to this example, the topology data of the route ahead are evaluated in order to draw conclusions about the movements of the vehicle caused due to the topology. Acceleration forces (first acceleration forces) that act on a vehicle occupant sitting on a vehicle seat due to the movements of the vehicle are calculated on the basis of the calculated movements of the vehicle (movement data). By way of example, the movement data that move the vehicle up and down due to bumpy ground over which the vehicle travels are calculated. The acceleration forces that act on the vehicle occupant along the vehicle height axis are then calculated from these movement data.

The seat adjustment signals are calculated such that they exert acceleration forces (second acceleration forces) that counteract or cancel out the first acceleration forces on the vehicle occupant. According to the above example, acceleration forces that likewise act on the vehicle occupant along the vehicle height axis but that act in the opposite direction to the first acceleration forces are thus calculated. The respective vehicle seat is then adjusted according to the calculated seat adjustment signals. The seat adjustment signals are calculated and the vehicle seat is correspondingly adjusted continuously in real time in this case.

The actually acting acceleration forces that act on the vehicle occupant after applying the second acceleration forces (through the vehicle seat adjustment) are furthermore calculated. It should be assumed in this example that the actually acting acceleration forces are lower than the first acceleration forces but are not other than zero. According to the above example, a vehicle occupant sitting on the vehicle seat would experience acceleration forces along the vehicle height axis, but these would be considerably reduced in comparison with the acceleration forces that would act on the vehicle occupant as a result of driving over bumpy ground. In accordance with the actually acting acceleration forces, display signals are displayed on a display visible to the vehicle occupant (for example display in the headrest of the front seat), allowing the vehicle occupant to visually experience the journey over bumpy ground. A video that simulates the view of the vehicle occupant from the vehicle in the direction of travel is for example played back on the display. A bumpy road is accordingly displayed, and the image shown in the display is moved down or up when it is driven over.

Figure 2:
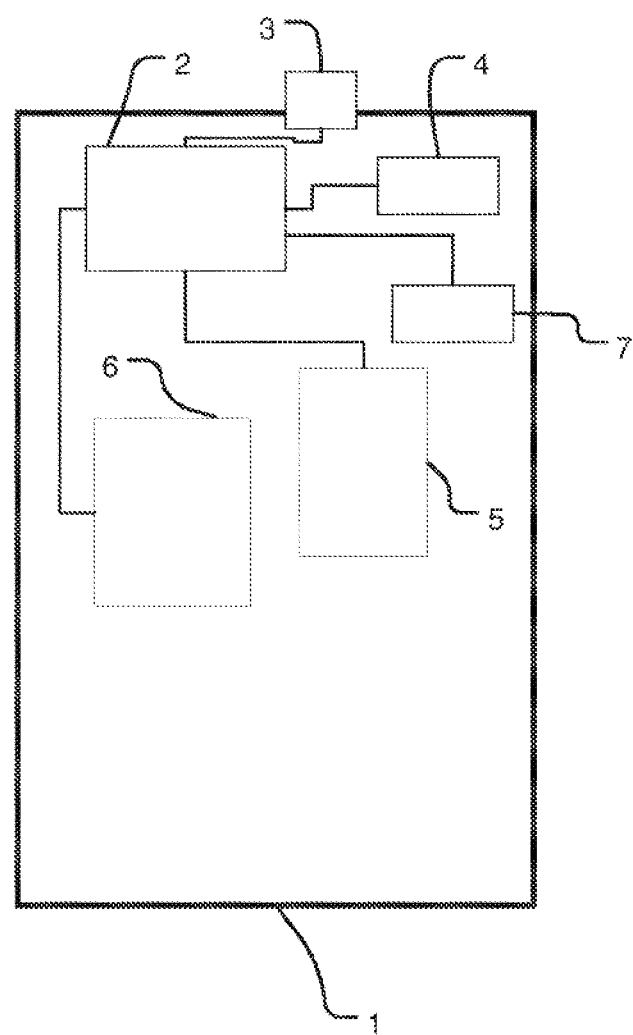
FIG. 2 schematically shows a system for reducing motion sickness symptoms according to one embodiment.

FIG. 2 schematically shows a further embodiment of the system according to the invention for reducing motion sickness symptoms. In this case, the system has a warning unit 7 that is coupled to the control unit 2 in order to exchange signals. In this example, the warning unit 7 comprises speakers internal to the vehicle and the infotainment system internal to the vehicle. The control unit 2 calculates, on the basis of the surroundings data, in particular on the basis of the surroundings data obtained from the surroundings sensor system 3, whether the vehicle will have an unavoidable collision, for example with another vehicle, within a predefined duration, for example a duration of 20 seconds. If the control unit 2 calculates that this will be the case, then it prompts the speakers of the warning unit 7 to emit noises similar to a collision. The noises similar to a collision are intended to incite the vehicle occupant to lift their hands or arms in a protective manner in front of their face or head as a reflex and/or to bend their head forward or down as a reflex and/or to brace their muscles as a reflex.

Figure 3:
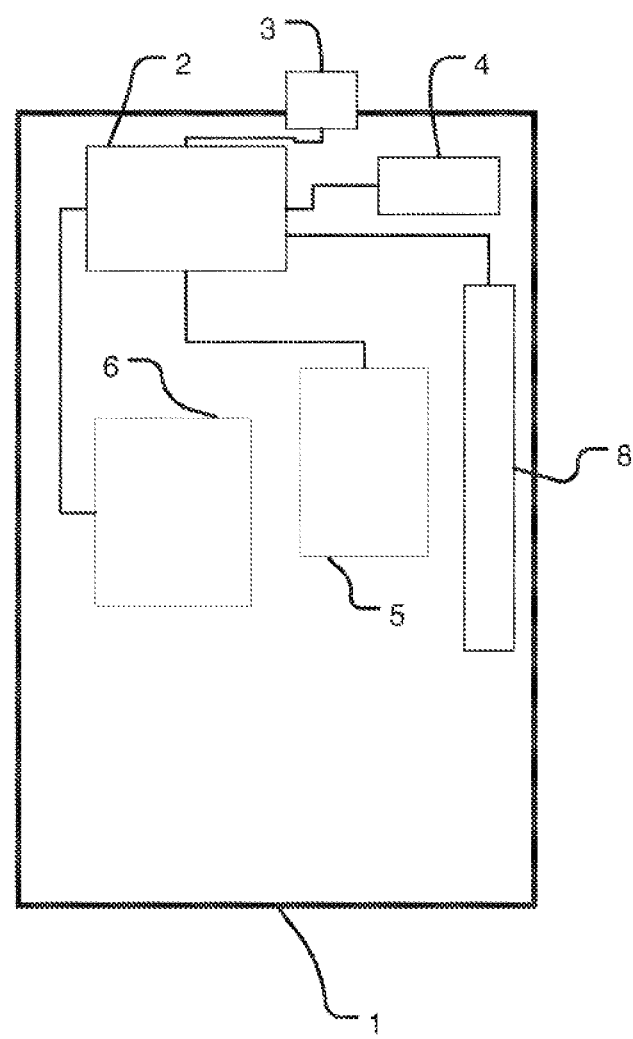
FIG. 3 schematically shows a system for reducing motion sickness symptoms according to one embodiment.

FIG. 3 schematically shows a further embodiment of the system according to the invention for reducing motion sickness symptoms. In this case, the system has an interior camera 8 that observes the vehicle occupants and records and/or evaluates image data. In this case, it is evaluated from the image data whether the observed vehicle occupant is capable of perceiving a situation external to the vehicle. If this is the case, a positive monitoring signal is emitted to the control unit 2. If this is not the case, a negative monitoring signal is emitted to the control unit 2. If a negative monitoring signal is established, it is assumed that the respective vehicle occupant is incapable of recording the surroundings of the vehicle and is therefore susceptible to motion sickness symptoms. On the basis of the negative monitoring signal, the vehicle seat is then adjusted in order to counteract the movements of the vehicle and/or the display of the display signals is set such that motion sickness symptoms are reduced.

What is claimed is:

1. A system for reducing motion sickness symptoms in operation of a vehicle, comprising:
   at least one of a sensor system or a navigation system;
   a vehicle seat system;
   a display unit;
   a control unit coupled to the at least one of the sensor system or the navigation system, the control unit being further coupled to the vehicle seat system and to the display unit, wherein:
   the sensor system and the navigation system are configured so as to receive surroundings data and vehicle component data of the vehicle from which movements of the vehicle result and to transmit the surroundings data and the vehicle component data to the control unit,
   the vehicle seat system is configured so as to receive seat adjustment signals from the control unit and to adjust at least one vehicle seat of the vehicle in accordance with the received seat adjustment signals,
   the display unit is configured so as to receive display signals from the control unit and to display the display signals,
   the control unit is configured so as to generate seat adjustment signals and display signals depending on the received surroundings data and vehicle component data,
   generating the seat adjustment signals comprises:
      determining first acceleration forces that would act on a vehicle occupant sitting on a vehicle seat due to the movements of the vehicle using the surroundings data and vehicle component data; and
      determining seat adjustment signals that are designed such that they bring about second acceleration forces that counteract the first acceleration forces for the vehicle occupant after adjusting the vehicle seat in accordance with these seat adjustment signals; and
   generating the display signals comprises:
      determining acceleration forces actually acting on the vehicle occupant on the vehicle seat adjusted in accordance with the seat adjustment signals; and
      determining display signals that are designed such that they bring about a sensory perception, congruent with the acceleration forces actually acting on the vehicle occupant on the vehicle seat adjusted in accordance with the seat adjustment signals.

2. The system according to claim 1, wherein at least one of:
   the control unit is further configured so as to generate the seat adjustment signals only for a vehicle seat whose orientation deviates from a direction of travel of the vehicle,
   the vehicle seat system is further configured so as to receive seat adjustment signals from the control unit only for a vehicle seat whose orientation deviates from the direction of travel of the vehicle, and
   the vehicle seat system is further configured so as to adjust only a vehicle seat whose orientation deviates from the direction of travel of the vehicle in accordance with the received seat adjustment signals.

3. The system according to claim 1, wherein the display signals comprise at least one of:
   artificial optical surroundings, wherein the artificial optical surroundings are displayed outside a viewing axis of the vehicle occupant and within an individual field of view of the vehicle occupant;
   artificial acoustic surroundings;
   holographic image elements;
   air flows; or
   haptic effects on the vehicle occupant, including at least one of massage effects or vibration effects.

4. The system according to claim 1, wherein the display signals are varied depending on at least one of surroundings of the vehicle, a time of day, or weather.

5. The system according to claim 1, wherein the display unit is configured such that displayed display signals are not visible at a same time to all vehicle occupants.

6. The system according to claim 1, wherein the second acceleration forces are large enough that the first acceleration forces and the second acceleration forces cancel one another out.

7. The system according to claim 1, wherein the system further comprises a warning unit that is coupled to the control unit, and
   wherein the control unit is further configured so as to use the received surroundings data and vehicle component data to determine whether the vehicle will have an unavoidable crash within a predefined duration and, in an event that the vehicle will have an unavoidable crash within the predefined duration, to prompt the warning unit to output warning signals that are designed to bring about reflex protective reactions in vehicle occupants.

8. The system according to claim 1, wherein the display unit is further configured such that the displayed display signals are in each case visible only to one vehicle occupant,
   wherein the system further comprises a monitoring unit that is coupled to the control unit in order to receive and emit signals and is configured so as to monitor whether a vehicle occupant is capable of perceiving a situation external to the vehicle, and to emit a positive monitoring signal to the control unit if upon determining that the one vehicle occupant is capable of perceiving the situation external to the vehicle, and to emit a negative monitoring signal to the control unit if upon determining that the respective vehicle occupant is incapable of perceiving the situation external to the vehicle, and
   wherein the control unit is further configured so as to at least one of:
      generate seat adjustment signals for the vehicle seat on which the one vehicle occupant is sitting, or
      generate display signals for the respective vehicle occupant only upon determining that a negative monitoring signal is present.

9. The system according to claim 1, wherein the system further comprises a monitoring unit that is coupled to the control unit in order to receive and emit signals and is configured so as to monitor whether a vehicle occupant is capable of perceiving a situation external to the vehicle, and to emit a positive monitoring signal to the control unit upon determining that the vehicle occupant is capable of perceiving the situation external to the vehicle, and to emit a negative monitoring signal to the control unit upon determining that the vehicle occupant is incapable of perceiving the situation external to the vehicle,
   wherein the vehicle seat system is further configured so as to at least one of:

receive seat adjustment signals for the vehicle seat on which the respective vehicle occupant is sitting, or adjust the vehicle seat on which the respective vehicle occupant is sitting only upon determining that a negative monitoring signal is present, and wherein the display unit is further configured so as to at least one of receive or to display signals for the respective vehicle occupant only if upon determining that a negative monitoring signal is present.

10. A vehicle comprising a system according to claim 1.

11. A method for reducing motion sickness symptoms, the method comprising:
  receiving surroundings data and vehicle component data of a vehicle from which movements of the vehicle result;
  generating seat adjustment signals and display signals depending on the received surroundings data and vehicle component data;
  adjusting at least one vehicle seat of the vehicle in accordance with the seat adjustment signals; and
  displaying the display signals;
  wherein generating the seat adjustment signals comprises:
    determining first acceleration forces that would act on a vehicle occupant sitting on a vehicle seat due to the movements of the vehicle using the surroundings data and vehicle component data; and
    determining seat adjustment signals that are designed such that they bring about second acceleration forces that counteract the first acceleration forces for the vehicle occupant after adjusting the vehicle seat in accordance with these seat adjustment signals; and
  wherein generating the display signals comprises:
    determining acceleration forces actually acting on the vehicle occupant on the vehicle seat adjusted in accordance with the seat adjustment signals; and
    determining display signals that are designed such that they bring about a sensory perception, congruent with the acceleration forces actually acting on the vehicle occupant on the vehicle seat adjusted in accordance with the seat adjustment signals.

* * * * *